(12) United States Patent
Schimmler

(10) Patent No.: US 8,800,925 B2
(45) Date of Patent: Aug. 12, 2014

(54) HOLDER ASSEMBLY FOR A SECURE LINE INSTALLATION IN STRUCTURE OPENINGS OF AIRCRAFT

(75) Inventor: Marc Schimmler, Himmelpforten (DE)

(73) Assignee: Airbus Operations GmbH (DE)

( * ) Notice: Subject to any disclaimer, the term of this patent is extended or adjusted under 35 U.S.C. 154(b) by 39 days.

(21) Appl. No.: 13/487,316

(22) Filed: Jun. 4, 2012

(65) Prior Publication Data

US 2013/0001361 A1    Jan. 3, 2013

Related U.S. Application Data

(60) Provisional application No. 61/502,996, filed on Jun. 30, 2011.

(30) Foreign Application Priority Data

Jun. 30, 2011    (DE) .......................... 10 2011 107 611

(51) Int. Cl.
*B64C 1/00*        (2006.01)

(52) U.S. Cl.
USPC ....................................................... 244/129.1

(58) Field of Classification Search
USPC ....................................................... 244/129.1
See application file for complete search history.

(56) References Cited

U.S. PATENT DOCUMENTS

| | | | |
|---|---|---|---|
| 2,325,616 A * | 7/1943 | Landweber .................... 114/244 |
| 2,447,830 A * | 8/1948 | Wood .............................. 248/62 |
| 2,900,496 A * | 8/1959 | Williams ....................... 362/444 |
| 2,914,090 A * | 11/1959 | Isenberg ........................ 138/113 |
| 3,693,001 A * | 9/1972 | Rogers ........................... 362/434 |
| 4,100,367 A * | 7/1978 | Netzel .............................. 174/28 |
| 4,263,476 A * | 4/1981 | Netzel ............................ 174/156 |
| 4,352,255 A * | 10/1982 | Warehime ..................... 446/120 |
| 4,539,631 A * | 9/1985 | Lieberman .................... 362/351 |
| 4,605,996 A * | 8/1986 | Payne ............................ 362/352 |
| 4,715,571 A * | 12/1987 | Soltow et al. ................. 248/68.1 |
| 4,930,544 A * | 6/1990 | Ziu ................................ 138/113 |
| 4,946,117 A * | 8/1990 | Liesegang ........................ 248/65 |
| 5,243,138 A * | 9/1993 | Guthke et al. ................ 174/146 |
| 5,375,048 A * | 12/1994 | Barnes .......................... 362/352 |
| 5,410,128 A * | 4/1995 | Vermillion et al. ...... 219/454.12 |
| 6,409,365 B1 * | 6/2002 | Lin ................................ 362/404 |
| 6,465,741 B2 * | 10/2002 | Pionek et al. ................. 174/174 |
| 6,896,004 B1 * | 5/2005 | Witzel .......................... 138/112 |
| 7,367,403 B2 * | 5/2008 | Webre et al. .................. 166/379 |
| D643,883 S * | 8/2011 | Dawes ......................... D21/488 |
| 8,172,636 B1 * | 5/2012 | Carbonero .................... 446/120 |
| 2005/0197197 A1 * | 9/2005 | Scott ............................ 473/173 |

FOREIGN PATENT DOCUMENTS

| | | |
|---|---|---|
| DE | 4008239 C1 | 12/1991 |
| DE | 102007061425 A1 | 7/2009 |
| DE | 202008002786 U1 | 7/2009 |

* cited by examiner

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

A holder assembly for a line installation in an opening of a support structure of an aircraft, includes at least one holder element to mount a line that is guided through the opening, with the line featuring a clamping section, arranged radially on the outside, to be attached to the opening as well as at least one central receiving section to fix the line, wherein the receiving section of a first holder element encompasses the line hook-like, and the receiving section of at least a second, oppositely positioned holder element also encompasses the line hook-like such that both hook-like receiving sections encompass the line.

9 Claims, 3 Drawing Sheets

HOLDER ASSEMBLY FOR A SECURE LINE INSTALLATION IN STRUCTURE OPENINGS OF AIRCRAFT

CROSS-REFERENCE TO RELATED APPLICATIONS

This application claims the benefit of the filing date of U.S. Provisional Patent Application No. 61/502,996 filed Jun. 30, 2011, the disclosure of which is hereby incorporated herein by reference.

FIELD OF THE INVENTION

The present invention relates to a holder assembly for a line installation in an opening of a support structure of an aircraft, comprising at least one holder element for mounting a line that is guided through the opening, which comprises a clamping section arranged radially on the outside for fastening the line at the opening as well as at least one central receiving section for fixing the line.

The area of application of the present invention particularly extends to the construction of aircraft. However, it is also conceivable to use the holder assembly according to the invention in context with other installation scenarios in vehicles, or also in buildings and similar, whereby lines need to be guided through existing openings in support structures such as walls, struts and similar such that the line does not get in contact with the support structure itself. It is particularly important to avoid any contact to prevent abrasion between the support structure and the line as a consequence of relative motions.

BACKGROUND OF THE INVENTION

According to the generally known state of the art, electric or fluidic lines are usually fastened to a support structure by means of screwed or riveted holder assemblies. In doing so, the holder is firstly arranged to the support structure by separate fastening means such as screws, and a receiving section of the holder assembly receives the line, which may be achieved by means of a clip connection, a sleeve connection, or similar. In these solutions, a high assembly effort is encountered when positioning the holder assembly to the support structure, the installation of the fastening means as well as the mounting of the line to the holder assembly. Particularly in vehicle technology, mounting holes for receiving fastening means have a weakening effect on the support structure. To avoid this, usually constructive thickness increases need to be provided in the areas where fastening will occur.

DE 40 08 239 C1 discloses a technical solution, which proposes a holder assembly making do without separate fastening means, by means of which a line may be fastened to an opening within a support structure. The holder assembly is intended for the fastening of an electrical power line comprising a plurality of individual cables, wherein a disk made of synthetic material having edge recesses is provided, and the edge recesses are each covered by lugs running in the circumferential direction such that they fix the individual cables by means of pretensioning. To mount the holder assembly within an opening, it is embodied in two parts, wherein each half of the holder comprises a curved shell close to the centre point of the disk which may receive a central line, which forms the core of the power line as an energising line. The energising line is encompassed by both shells, and the individual remaining cables of the power line are received by the edge recesses, which are distributed around the central power line in a star-shaped manner. The holder assembly as a total is inserted into openings of common supports mounted to the structure in a form-fitting manner, and is secured by means of a tightening strap.

A disadvantage in this technical solution is the particular conception focusing on a multi-core electrical line such that this state of the art is applicable only in this particular embodiment. Consequently, the holder assembly is quite a complicatedly constructed component, the mounting of which proves to be quite complex, as all lugs pointing radially outside, one after the other, need to be clamped to the edge region of the opening in a form-fitting manner.

An aspect of the present invention, therefore, provides a holder assembly to install differently embodied lines without needing any fastening means in openings of a support structure, which is simply structured and can be mounted quickly and safely.

BRIEF SUMMARY OF THE INVENTION

An aspect of the present invention includes the technical teaching that a receiving section of a first holder element encompasses a line hook-like, and the receiving section of at least a second holder element positioned opposite also encompasses the line hook-like such that the line is, at least partly, jointly encompassed by the hook-like receiving sections. In doing so, the clamping sections arranged radially on the outside are fastened to the edge region of the opening in a form-fit manner.

The advantage of an embodiment of the invention is, in particular, that merely two holder elements suffice to provide a secure fastening of a line at an opening without that additional fastening means are required. Depending on the embodiment of the hook-like receiving sections, lines of very different diameters may be mounted by means of this constructive solution. The holder assembly may be arranged in a simple manner by means of the clamping sections of the holder elements at the edge region of the opening, and the hook-like receiving sections positioned oppositely from one another encompass the line on the side positioned opposite of the clamping section. Thus the holder assembly can be securely fastened both to the edge region of the opening and to the line in a simple manner.

According to a preferred form of embodiment, the two hook-like receiving sections run, in mounted condition, in opposite direction such that the two hook-like receiving sections of the two holder elements are arranged adjacent to one another. In other words, a connection is obtained by placing a central bridging section between the receiving section and the clamping section such that the two receiving sections can be arranged passing one another. In doing so, the bridging section, preferably, is provided with an angled step relative to the level of the opening such that the two hook-like receiving sections abut the line adjacent to one another in the same level. Thus the line can be encompassed in a space reducing and safe manner.

By means of this preferred form of embodiment, the first holder element and the second holder element may be embodied as identical parts such that the holder assembly can be produced in a simple manner. Preferably, the individual holder elements consist of synthetic material, which is efficiently producible by injection moulding. Besides that it is also possible to manufacture the holder elements from sheet metal by bending or a similar process.

According to another measure improving the invention it is proposed that the hook-like receiving sections in mounting condition form a guideway at least in the form of a ring segment, for receiving a cable tie as a fastening element between the holder elements and the line. The guideway runs on the level of the opening, and by means of a simple cable tie it is possible to obtain a firm connection towards the line. The guideways in the form of a ring segment at the receiving sections of the holder elements may have a u-shaped cross-section to adapt themselves to the geometry of the cable tie.

The holder assembly according to the invention can also be constructively adapted to the cross-section of the opening. Thus the opening may be embodied circular, oval, rectangular or polygonal, and the clamping section arranged radially on the outside of the holder element is adapted to the cross-sectional profile of the opening in a form-fit manner. For example, when there is a circular opening, the clamping sections run accordingly in the form of a circular arc.

To attach the holder elements to the edge region of the opening, the clamping sections arranged radially on the outside of the holder element, preferably, comprise a u-shaped cross-section.

In a preferred form of embodiment of the holder assembly, merely two holder elements are applied, the two hook-like receiving sections of which, in mounted condition, each halfway encompass the line approximately such that the line is completely encompassed by both hook-like receiving sections.

BRIEF DESCRIPTION OF THE DRAWINGS

Further measures improving the invention are described in more detail in the following together with a description of a preferred example of embodiment of the invention by means of the figures. The following is shown.

DETAILED DESCRIPTION

Figure 1:
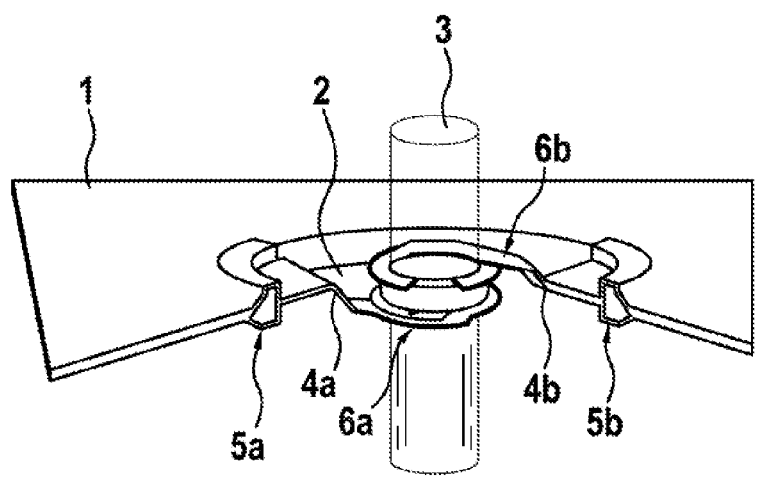
FIG. 1 a perspective view of a partial section of a holder assembly mounted in an opening with a line fastened above, FIG. 2 a perspective view of a holder element of the holder assembly according to FIG. 1, FIGS. 3a-3c a perspective sequence of views of the mounting of the holder assembly, and FIG. 4 a schematic view of a further form of embodiment of the holder assembly intended for a rectangular opening.

According to FIG. 1, the support structure (1) of an aircraft, which is not further shown, comprises an opening (2). Through the opening (2), a line (3) is guided, which, by means of a holder assembly comprising two holder elements (4a) and (4b) at the opening (2), is mounted such that the line (3) does not get in contact with the support structure (1).

Both holder elements (4a and 4b) each comprise a clamping section (5) arranged radially on the outside and a central receiving section (6). The clamping section (5) arranged radially on the outside serves the fastening of the holder assembly at the opening (2) in a form-fit manner, and the receiving section (6) encompasses the line (3) to fix said line at the opening (2).

In the preferred form of embodiment shown, the two holder elements (4a and 4b) are mounted within the opening (2) positioned opposite from one another. Thus the line (3) is safely encompassed by the two hook-like receiving sections (6a and 6b), which run in opposite directions. In the mounted condition shown, the two hook-like receiving sections (6a and 6b) are arranged adjacent to one another and are embodied identically with respect to their shape of mould.

Figure 2:
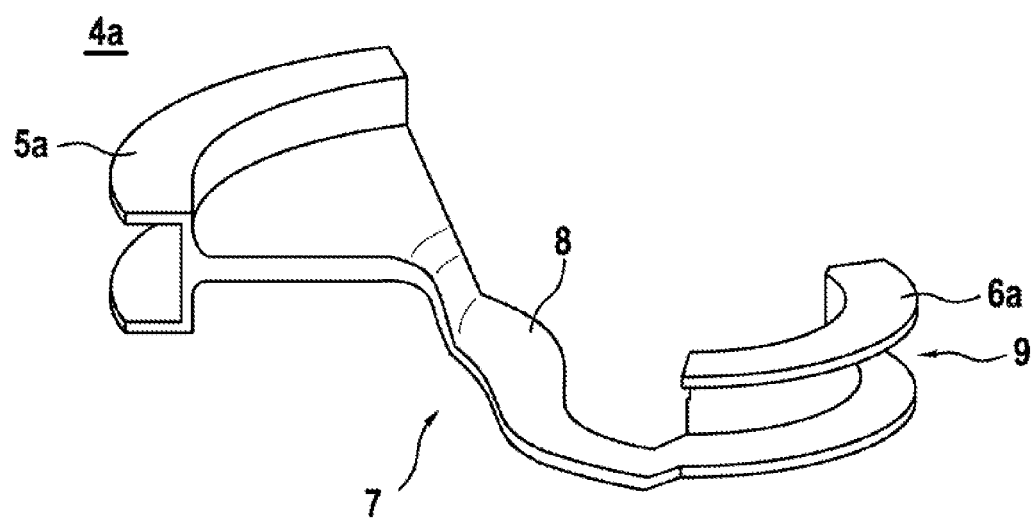

According to FIG. 2, the first holder element (4a) exemplarily shown here comprises a central bridging section (7) having an angled step (8) relative to the level of the opening (2), which is not further shown. By means of the step (8), the two holder elements (4a and 4b) can be arranged adjacent to one another closely spaced at the same level and at the level of the opening in a mounted condition.

The holder element (4a) comprises a guideway (9) in the form of a ring segment on the side of the hook-like receiving section (6a). The guideway (9) serves the receipt of a cable tie, which is not further shown here, as a fastening element between the holder elements (4a and 4b) and the line (3).

The clamping section (5a) arranged radially on the outside of the holder element (4a) comprises a u-shaped cross section to attach elements onto the opening (2), which is not further shown, of the support structure (1).

Figure 3A:
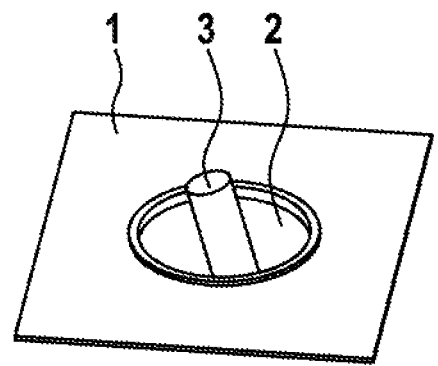
Figure 3B:
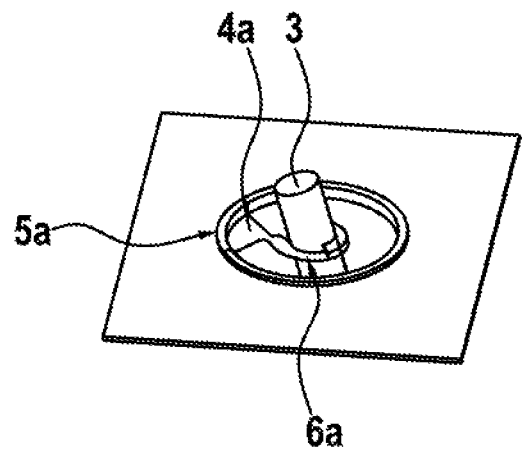
Figure 3C:
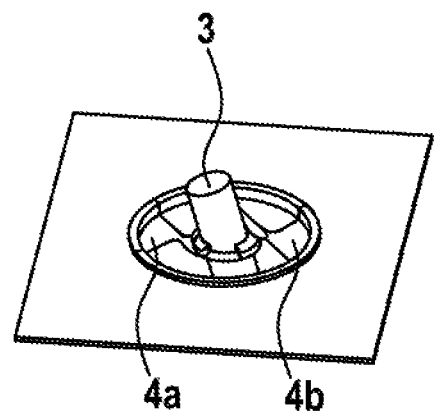

According the sequence of FIGS. 3a to 3c, the mounting of the line (3) within the opening (2) of the support structure (1) is carried out such that, initially, according to FIG. 3a, the line (3) is guided through the centre of the opening (2). Then, according to FIG. 3b, the first holder element (4a) is mounted such that it is connected to the clamping section (5a) on the side of the opening (2) as well as to the receiving section (6a) on the side of the line (3) in a form-fitting manner. Eventually, according to FIG. 3c, the holder element (4b) positioned opposite thereto is mounted in the same manner, and to secure the connection, a cable tie is fastened around the receiving sections (6a and 6b).

Figure 4:
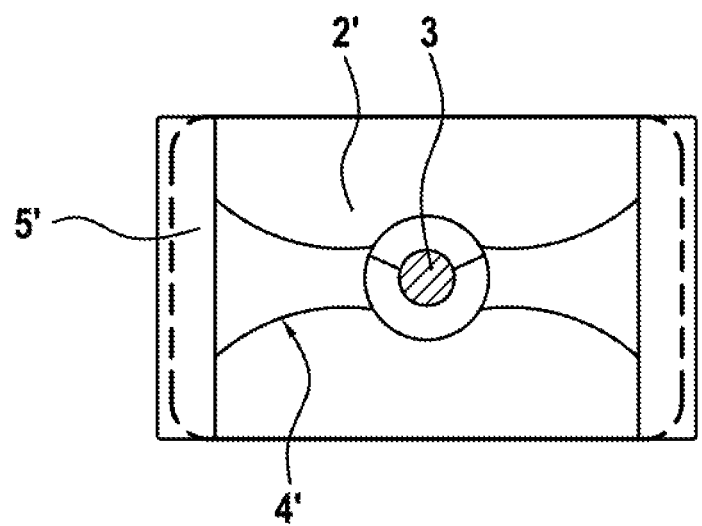

According to the example of embodiment shown in FIG. 4, the opening (2') is embodied rectangular, and the clamping section (5') arranged radially on the outside of the holder element (4') (exemplary) is adapted to the cross-sectional profile of the rectangular opening (2') in a form-fit manner such that the clamping section (5') extends over the whole narrow side of the rectangular opening (2') to guide the line (3) centrally through it.

LIST OF REFERENCE SIGNS

1 Support structure
2 Opening
3 Line
4 Holder element
5 Clamping section
6 Receiving section
7 Bridging section
8 Angled step
9 Guideway

The invention claimed is:

1. A holder assembly for a line installation in an opening of a support structure of an aircraft, the assembly comprising:
   at least first and second holder elements for assembly of a line guided through the opening, each of the first and second holder elements comprising a channel shaped clamping section arranged radially on the outside for fastening at the opening of the support structure of the aircraft and at least one hook-shaped central receiving section to fix the line;
   wherein the hook-shaped receiving section of the first holder element partially encompasses the line, and the hook-shaped receiving section of the second holder element positioned opposite also partially encompasses the line such that the line is jointly encompassed by the hook-shaped receiving sections; and
   wherein the hook-shaped receiving sections in mounted condition form a guideway at least in the form of a ring segment for receiving of a cable tie as a fastening element for fastening the holder elements to the line.

2. The holder assembly according to claim 1, wherein the two hook-shaped receiving sections run in opposite directions such that the hook shaped receiving sections in mounted condition are arranged adjacent to one another.

3. The holder assembly according to claim 1, wherein each of the first and second holder elements comprises a central bridging section having an angled step relative to the level of the opening such that the hook shaped receiving sections are arranged adjacent to one another on the same level.

4. The holder assembly according to claim 1, wherein the first holder element and the second holder element are embodied identically.

5. The holder assembly according to claim 1, wherein each of the first and second holder elements comprises an injection-moulded component consisting of synthetic material.

6. The holder assembly according to claim 1, wherein the line comprises an electrical or fluidic line.

7. The holder assembly according to claim 1, wherein the opening comprises a circular, oval or rectangular cross section, and wherein the clamping section arranged radially on the outside of the holding element is adapted to the cross-sectional profile of the opening in a form-fitting manner.

8. The holder assembly according to claim 1, wherein the clamping section arranged radially on the outside of the holding element comprises a u-shaped cross-section for attachment onto the edge region of the opening.

9. The holder assembly according to claim 1, wherein the hook shaped receiving sections each encompass the line in mounted condition halfway such that the line is completely encompassed by the hook shaped receiving sections.

* * * * *